Nov. 20, 1962     S. SCHNELL     3,064,346
METHOD OF FORMING DISC BRAKE PISTON
Original Filed July 15, 1957
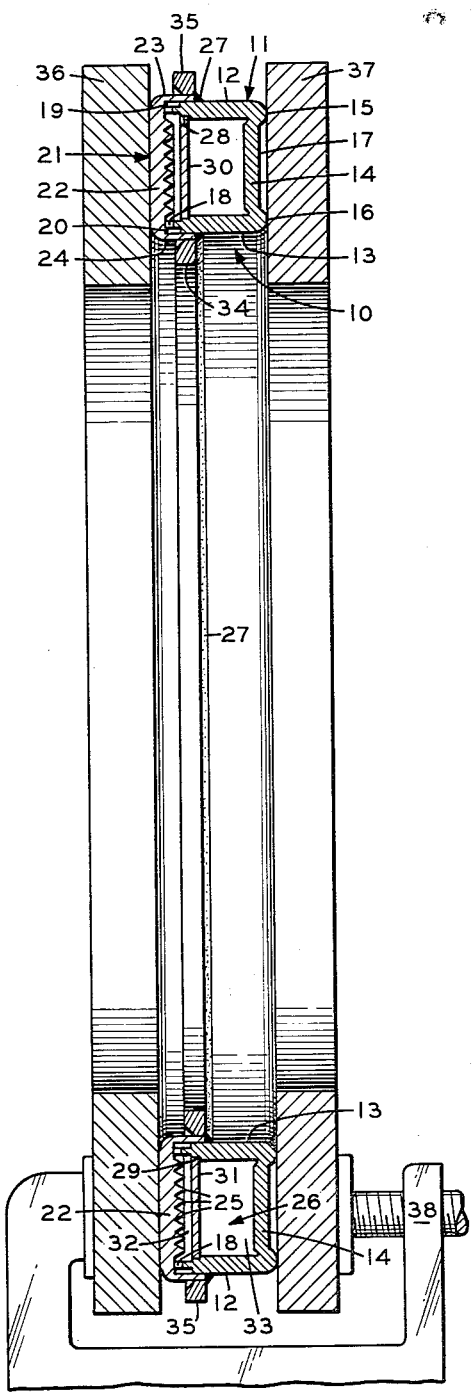
INVENTOR.
STEVE SCHNELL
BY
ATTORNEYS 3,064,346
Patented Nov. 20, 1962

3,064,346
METHOD OF FORMING DISC BRAKE PISTON
Steve Schnell, Berkeley, Mo., assignor to Wagner Electric Corporation, St. Louis, Mo., a corporation of Delaware
Original application July 15, 1957, Ser. No. 671,953, now Patent No. 2,964,136, dated Dec. 13, 1960. Divided and this application Dec. 23, 1959, Ser. No. 861,648
5 Claims. (Cl. 29—493)

This invention relates generally to the art of assembling annular parts and in particular to a method of forming an annular piston assembly for a disc brake.

In the past, parts forming annular piston assemblies for disc brakes have been provided with radially extending flanges which have been held in surface contact and secured by rivets, brazing or the like. Other prior art methods of assembling annular piston assembly parts have required precise machining of parts or the use of seals in final assembly in order to assure fluid tight chambers and secure assembly.

The principal object of the instant invention is to provide an improved method of assembling annular disc brake parts which obviates the disadvantages known heretofore and provides a simple efficient method of producing uniform brake assemblies.

These and other objects and advantages will become apparent hereinafter.

Briefly, the present invention comprises the method of pre-assembling telescopically arranged first and second piston forming annular members, applying opposing forces maintaining the first and second members in telescopic relationship, applying a compressive force holding the side walls of the members in surface abutment, and providing means securing the side walls of the members together in sealed relationship. The invention further consists in the method of assembling the parts of the article, as set forth in the following description.

In the accompanying drawing which forms a part of the present disclosure and wherein like numerals refer to like parts wherever they occur, the single FIGURE is a sectional view showing a typical piston assembly in cross section during manufacture to illustrate the present method.

This application is a division of co-pending patent application Serial No. 671,953, filed July 15, 1957, now Patent No. 2,964,136, entitled "Annular Piston Assembly for a Disc Brake".

A typical annular piston assembly 10 made according to the present method comprises a piston member 11 that is U-shaped or channel-shaped in cross-section and includes axially-extending radially-spaced side walls 12 and 13 interconnected by a base wall 14, which includes annular peripheral ribs 15 and 16 defining a recess 17 therebetween. The free ends of the piston side walls 12 and 13 are provided with a plurality of spaced cross-passages or slots 18, and peripheral expansion grooves 19 and 20 are formed in the remote or outer surfaces of the side walls 12 and 13 in communication with the cross-passages 18.

The piston assembly 13 also comprises a friction plate 21 which is preferably formed of a relatively thin, annular, metal plate having high heat conductivity properties. The plate 21 includes a base wall 22 with radially-spaced axial flanges or side walls 23 and 24, the base wall 22 having a plurality of annular cooling fins 25 or the like on the inner surface thereof. The friction plate 21 is secured to the open end of the piston 11 opposite the piston base wall 14 to define a closed chamber 26 therebetween, the free ends of the piston side walls 12 and 13 abutting the interior surface of the plate base wall 22 adjacent to the plate flanges 23 and 24. The free ends of the plate flanges 23 and 24 extend axially past the expansion grooves 19 and 20 and are in telescopic surface abutment with the remote or outer surfaces of the piston side walls 12 and 13. The piston 11 and the friction plate 21 are secured in fixed relationship according to the present method by annular fillet welds or brazing 27. It is apparent that substantially the entire interior surface of the friction plate 21 is exposed to the chamber 26 either directly or through the cross-passages 18 and the peripheral expansion grooves 19 and 20.

The inner or adjacent surfaces of the piston side walls 12 and 13 are provided with aligned circumferential grooves 28 and 29 in which a pair of baffles 30 and 31 are secured in circumferential alignment, the baffles 30 and 31 dividing the chamber 26 into a circulatory chamber 32 defined between the baffles and the friction plate 21 and a static chamber 33 defined between the baffles and the piston base wall 14. Adjacent end portions of each of the baffles 30 and 31 are spaced apart in alignment with an inlet and an outlet (not shown) to the chamber 26 for the admission and circulation of cooling fluid during actual operation of the piston device 10 in a brake system. It is also apparent that if unusually high heat is required to secure the parts by brazing or the like, cooling fluid may be circulated through the circulation chamber 26 during assembly of the parts by this method to dissipate this heat.

The piston assembly 10 may also include other features important to its function in a brake system, but forming no part of the present method.

The present method of assembling the friction plate 21 and the piston member 11 to form the piston assembly 10 includes the pre-assembly steps of positioning the baffle plates 30 and 31 in the circumferential grooves 28 and 29 of the adjacent piston side walls 12 and 13, and telescoping the flanges 23 and 24 of the friction plate 21 with the remote surfaces of the piston side walls 12 and 13. Thus, the friction plate 21 is in pre-assembled position with the piston member 11 and the free ends of the piston side walls 12 and 13 are abutting the friction plate base wall 22.

An annular expansion ring 34 is provided for pressing the inner flange 24 of the friction plate 21 against the inner wall 13 of the piston member 11. The expansion ring 34 is compressed slightly and positioned substantially in radial alignment with the baffle members 30 and 31 and permitted to expand to press into position against the flange 24 of the friction plate 21 thereby effecting a light press fit between the abutting surfaces of the piston side wall 13 and the friction plate flange 24. An annular compression ring 35 is positioned about the outer surface of the friction plate flange 23 to cause a light press fit between this flange and the piston side wall 12. When thus arranged, the rings 34 and 35 are aligned with the free end margins of the friction plate flanges 23 and 24 and form expansion and compression means to hold the abutting portions of the friction plate flanges in a sealed condition with the side walls 12 and 13 of the piston member 11.

The expansion and compression rings 34 and 35 are preferably continuous for exerting even pressures on all portions of the telescoped piston assembly parts. For instance, the rings 34 and 35 may be a continuous helical plate ring or it may be desired to merely use split rings of predetermined force and size. It is apparent that a split ring may be compressed or expanded from its natural diameter and, thus, may be used either as an expansion ring or as a compression ring for different sized piston assemblies.

Annular clamping plates or blocks 36 and 37 are positioned in abutting relationship with the base walls 14 and 22 of the piston member 11 and friction plate 21 and the clamping plates 36 and 37 are held in position by a plurality of C-clamps 38 or the like. Accordingly, the friction plate 21 and piston member 11 are held in assembled relationship by the axial pressures exerted thereagainst by the clamping plates 36 and 37 to prevent warpage of the piston assembly 10 during welding or brazing.

A brazing material, such as silver solder or the like, is positioned at the free ends of the friction plate flanges 23 and 24 and against the piston side walls 12 and 13 to form annular rings of material therebetween. The brazing material is then heated to liquefying temperature and then cooled to form the continuous fillet welds 27 permanently securing the friction plate 21 and piston member 11 together.

It is now apparent that the clamping plates 36 and 37 exert axial pressures maintaining the piston assembly 13 in assembled non-warping condition, and that the annular expansion and compression rings 34 and 35 exert radial pressures maintaining the side walls of the piston member and friction plate in abutting sealed condition whereby the brazing material is prevented from entering and blocking the peripheral expansion grooves 45 and 46 between the respective side walls of the piston member 31 and friction plate 47.

The present disclosure is intended to cover all changes and modifications of the present invention which will be apparent to one skilled in the art and which do not constitute departures from the spirit and scope thereof, the present invention being limited only by the claims which follow.

What I claim is:

1. The method of assembling an annular friction plate member having radially-spaced axial side walls and a radial base wall and a piston member having radially-spaced axial side walls and a radial base wall to form a piston assembly, the method comprising the steps of arranging the side walls of said members in telescoping pairs of adjacent walls, pressing substantially continuous means into position with each pair of walls to press the adjacent walls in each pair into sealed condition, applying clamping means across the base walls of said members, and sealing the members together at the external juncture of each pair of walls.

2. The method of assembling an annular friction plate member having radially-spaced axial side walls and a radial base wall and an annular piston member having radially-spaced axial side walls and a radial base wall to form an annular piston assembly for a disc brake, the method comprising the steps of arranging the side walls of said members in telescoping pairs of adjacent walls in surface contact, pressing substantially continuous means into position with each pair of walls to press the contacting portions of the adjacent walls in each pair into sealed condition, applying clamping means across the base walls of said members, and brazing the members together at the external juncture of each pair of walls.

3. The method of assembling an annular friction plate having radially-spaced axial side flanges and a radial base wall and a piston member having radially-spaced axial side walls and a radial base wall to form a piston assembly for a disc brake, the method comprising the steps of pre-assembling the friction plate and piston member including positioning a baffle between the adjacent surfaces of the side walls of the piston member and telescoping the side walls within the side flanges of the friction plate to form surface abutments therebetween, pressing a substantially continuous annular member into expanding abutting position against one of the side flanges to press it into sealed condition with the abutting side wall, pressing another substantially continuous annular member into compressing abutting position with the other side flange to press it into sealed condition with the abutting side wall, positioning an annular clamping block in abutting position with each of the base walls, applying clamping pressures to the clamping blocks to hold the friction plate and piston member in fixed assembled relationship, and sealingly securing the friction plate and piston member together at the external juncture of the side flanges and side walls thereof.

4. The method of assembling an annular friction plate having radially-spaced axial side flanges and a radial base wall and a piston member having radially-spaced axial side walls and a radial base wall to form a piston assembly for a disc brake, the method comprising the steps of pre-assembling the friction plate and piston member including positioning a baffle radially between the adjacent surfaces of the side walls of the piston member and telescoping the side walls within the side flanges of the friction plate to form surface abutments therebetween substantially in the radial plane of said baffle, pressing an annular ring into expanding abutting position against one of the side flanges to press it into sealed condition with the abutting side wall, pressing another annular ring into compressing abutting position with the other side flange to press it into sealed condition with the abutting side wall, positioning an annular clamping block in abutting position with each of the base walls, applying clamping pressures to the clamping blocks to hold the friction plate and piston member in fixed assembled relationship, and brazing the friction plate and piston member together at the external juncture of the side flanges and side walls thereof.

5. The method of assembling an annular friction plate having axially-extending radially-spaced side flanges and a radial base wall and an annular piston member having axially-extending radially-spaced side walls and a radial base wall to form a piston assembly, the method comprising the steps of pre-asssembling the friction plate and piston member including positioning a baffle radially between the adjacent surfaces of the piston member side walls and fitting the piston member side walls into the friction plate side flanges to form continuous surface abutments therebetween, pressing an annular internal expansion ring into abutting position with the radially inner friction plate side flange to press the flange outwardly into sealed condition with the piston member side wall abutment therewith, pressing an annular external compression ring into abutting circumscribing position with the radially outer friction plate side flange to press the flange inwardly into sealed condition with the piston member side wall in abutment therewith whereby the baffle holds the piston member side walls in radially spaced relation and the rings exert opposing circumferential forces against the side walls and flanges of the piston member and friction plate, positioning annular clamping plates in abutting position with the base walls of the piston member and friction plate, applying clamping means across the clamping plates to exert opposing axial forces holding the piston member and friction plate in fixed assembled relationship, positioning brazing material circumferentially at the juncture of the side walls and flanges of the piston member and friction plate, and heating the brazing material to a liquifying temperature and subsequently cooling the brazing material to form continuous annular welds securing the piston member and friction plate together.

References Cited in the file of this patent

UNITED STATES PATENTS

| | | |
|---|---|---|
| 407,399 | Haines | July 23, 1889 |
| 926,000 | Hallowell | June 22, 1909 |
| 2,650,020 | Morrill | Aug. 25, 1953 |
| 2,758,367 | Dougherty | Aug. 14, 1956 |

UNITED STATES PATENT OFFICE
CERTIFICATE OF CORRECTION

Patent No. 3,064,346            November 20, 1962

Steve Schnell

It is hereby certified that error appears in the above numbered patent requiring correction and that the said Letters Patent should read as corrected below.

Column 1, line 43, for "patent" read -- parent --; column 2, line 4, after "fixed" insert -- telescopic --; column 4, line 44, after "wall" insert -- in --.

Signed and sealed this 21st day of May 1963.

(SEAL)
Attest:

ERNEST W. SWIDER
Attesting Officer

DAVID L. LADD
Commissioner of Patents